United States Patent [19]

Howard et al.

[11] Patent Number: 5,332,587
[45] Date of Patent: Jul. 26, 1994

[54] ACID STABILIZED PASTA

[75] Inventors: John G. Howard, Watlington King's Lynn, England; Harvey J. Reiter; Dale Fritsch, both of Houston, Tex.; Bryan Scherer, Spring, Tex.; Theodore J. LaFleur, Missouri City, Tex.

[73] Assignee: Mars, Incorporated, McLean, Va.

[21] Appl. No.: 836,007

[22] PCT Filed: Aug. 31, 1990

[86] PCT No.: PCT/US90/04990

§ 371 Date: Apr. 29, 1992

§ 102(e) Date: Apr. 29, 1992

[87] PCT Pub. No.: WO91/03169

PCT Pub. Date: Mar. 21, 1991

[30] Foreign Application Priority Data

Sep. 1, 1989 [GB] United Kingdom ............... 8919820

[51] Int. Cl.$^5$ ............................. A23L 1/16; A23L 3/10
[52] U.S. Cl. ..................................... 426/128; 426/321; 426/324; 426/325; 426/391; 426/401; 426/557
[58] Field of Search ............... 426/557, 324, 451, 381, 426/325, 106, 128, 391, 399, 401

[56] References Cited

U.S. PATENT DOCUMENTS

| 4,276,311 | 6/1981 | Burrows et al. | 426/56 |
| 4,435,435 | 3/1984 | Hsu | 426/557 |
| 4,504,504 | 3/1985 | Gaehring et al. | 426/321 |
| 4,517,215 | 5/1985 | Hsu | 426/557 |
| 4,544,563 | 10/1985 | Lechthaler | 426/276 |
| 4,552,772 | 11/1985 | Saitoh et al. | 426/557 |
| 4,597,976 | 7/1986 | Doster et al. | 426/325 |
| 4,599,238 | 7/1986 | Saitoh et al. | 426/557 |
| 4,659,576 | 4/1987 | Dahle et al. | 426/324 |
| 4,734,291 | 3/1988 | Raffensperger | 426/325 |
| 4,828,852 | 5/1989 | Hsu et al. | 426/94 |
| 4,844,936 | 7/1989 | Cox et al. | 426/549 |
| 4,888,193 | 12/1989 | Konno et al. | 426/549 |
| 4,959,230 | 9/1990 | Wyss et al. | 426/615 |

FOREIGN PATENT DOCUMENTS

| 1071920 | 2/1980 | Canada | 426/325 |
| 0322996 | 7/1989 | European Pat. Off. . | |
| 2130906 | 10/1972 | France . | |
| 2502907 | 10/1982 | France . | |
| 58-81735 | 5/1983 | Japan | 426/324 |
| 59-42838 | 3/1984 | Japan | 426/324 |
| 59-216542 | 12/1984 | Japan | 426/324 |
| 1118730 | 7/1968 | United Kingdom . | |

OTHER PUBLICATIONS

Patent Abstracts of Japan, vol. 12, No. 209, Jun. 15, 1988; for JP-A-63 007 770 (Nippon Kayaku Co., Ltd) Jun. 27, 1986.
Patent Abstracts of Japan, vol. 6, No. 63, Apr. 22, 1982; for JP-A-57 005 680 (Kibun K.K.) Jan. 12, 1982.
Patent Abstracts of Japan, vol. 12, No. 472, Dec. 9, 1988; for JO-A-63 192 353 (Otsuka Shokuhin Kogyo K.K.) Sep. 9, 1988.
Patent Abstracts of Japan, vol. 9, No. 125, May 30, 1985; for JP-A-60 012 946 (Marumi K.KI.) Jan. 23, 1985.
European Search Report for EP 90 30 9557.
European Search Report for EP 90 30 9558.
International Search Report for PCT/US90/04990.

Primary Examiner—Donald E. Czaja
Assistant Examiner—Mary S. Mims
Attorney, Agent, or Firm—Curtis, Morris & Safford

[57] ABSTRACT

Acid-stabilized pasta is prepared with at least one polymeric food-acceptable acid.

63 Claims, No Drawings

ACID STABILIZED PASTA

FIELD OF THE INVENTION

The present invention relates to acid-stabilized pasta and to processes for its preparation.

BACKGROUND OF THE INVENTION

Pasta is traditionally prepared by formulating a fresh pasta dough, and then boiling the dough in water to a minimal extent before consumption. As a result, the pasta has an appealingly fresh taste and texture. However, a major drawback of utilizing fresh pasta dough is that it has a high water content, which supports the growth of detrimental microorganisms, and, therefore, spoils rapidly if not used immediately. The fresh pasta dough is usually meant to be made, purchased and cooked in a short period of time. Often fresh pasta dough is refrigerated as a way of prolonging its life. But, even at low storage temperatures, fresh pasta dough has a very limited term.

One attempt to remedy the situation has been the provision of conventional dry pasta such as macaroni, spaghetti and noodles consisting basically of dough made with one or more of semolina, farina, or another flour, and water. The pasta is formed by extrusion into a variety of sizes and shapes, and dried to a moisture content of 12% or less to obtain a hard product for storage. At a moisture level of 12% or less, such dry pasta will not readily support the growth of mold, yeast or other spoilage microorganisms. Thus, the pasta, if kept dry, can be stored without refrigeration for long periods of time. However, the dried pasta must be cooked relatively extensively to effect re-hydration, often to the extent that the weight of the rehydrated pasta is, for example, 2.6 times that of its dry weight, and typically the rehydrated pasta does not simulate the taste and texture of a fresh pasta.

In another attempt, pasta has been precooked and provided in cans, typically with tomato sauce, meat sauce, gravy, meatballs, or the like. Canned pasta-containing products typically are prepared as follows: blanching dried pasta in boiling water to soften and hydrate the pasta to a water content of about 65% to 75%; filling the blanched pasta into a can together with sauce, meat, or the like; sealing the can; and retorting the sealed can under time-temperature conditions sufficient to provide a sterile product—typically about one hour at 115° C. Since the pasta is hydrated to a water level above 12%, the pasta has a water content which will support the growth of spoilage organisms. Therefore, the canned pasta-containing products must be subjected to relatively severe heat processing conditions in order to produce a sterile product, which is then maintained in the sterile state due to sealing in the can, so as to protect against microorganism-spoilage to make a commercially feasible product. Processing under these severe conditions results in a taste and texture which is less than optimal, and limits the acceptability of canned pasta-containing products.

Pasta is also available in a frozen, raw state which can be freshly boiled in the home immediately prior to consumption. However, freezing adds considerable expense to the manufacturing and delivery costs of the products. Moreover, frozen products are perceived by many consumers to be less desirable then products prepared directly from a fresh, unfrozen dough.

The art has long been searching for a pasta alternative to the foregoing. Such a pasta product should have an extended life at room temperature or under normal conditions of refrigeration, be easily prepared and stored, have substantially no off-flavor in a state suitable for consumption, be free of surrounding liquid in the stored condition, and (when in a state suitable for consumption) be at least as palatable and appear as pleasing as products prepared from conventional dry pasta.

In past attempts to achieve some of these desired attributes, it has been proposed that pasta could be treated with acid to yield a suitable product.

For example, U.S. Pat. No. 4,828,852 apparently relates to a process for the preparation of precooked pasta which requires boiling pasta in acidified water, soaking a partially cooked pasta in acidified water and coating the cooked pasta in acidified cream. The acids mentioned include malic, acetic, fumaric, tartaric, phosphoric and adipic.

U.S. Pat. No. 4,734,291 apparently discloses a process for preparing shelf-stable pasta by partially blanching and hydrating pasta, inserting the pasta into a container, adding an aqueous acidic solution, sealing the container and sterilizing the contents of the sealed container. Specific acids mentioned are fumaric, citric, tartaric, malic and lactic.

U.S. Pat. No. 4,659,576 apparently relates to pasta stabilized against microbial decomposition by adding acid to the raw pasta dough before making the pasta. Specific acids mentioned in this patent include acetic, citric, ascorbic, malic, fumaric, and tartaric.

U.S. Pat. No. 4,597,976 also apparently relates to use of acid in the raw pasta dough. Acids mentioned in this patent include citric, fumaric, lactic, malic, tartaric, sulfuric, hydrochloric and phosphoric acids.

U.S. Pat. Nos. 4,599,238 and 4,552,772 apparently relate to methods for preparing cooked pasta by boiling the pasta, washing the boiled pasta with water and immersing the boiled pasta in an aqueous solution containing citric acid, lactic acid and table salt, and then packaging and heat-sterilizing the pasta in an aqueous solution.

JP-A-6 307 770 apparently describes the preparation of a noodle which contains an acid preservative in its dough. The preservative includes a food-acceptable organic acid, a salt of such an acid and a water-soluble macromolecular polysaccharide or chitosan. The organic acid may be citric, tartaric, malic, fumaric, lactic, acetic or gluconic acid. The polysaccharide may be alginic acid or sodium alginate. However, the polysaccharide appears to be used solely as a texturizing agent. Based on an analysis of this application, it is believed that the free polysaccharide is not present as part of the final product since the polysaccharide appears to be neutralized by the organic acid salt. Moreover, there is no report of stability of the product beyond 10 days.

Thus, it can be seen that there have been many attempts to develop acid-treated pasta products which can be stored effectively for an extended period of time. However, these attempts typically involve treatment with conventional food acids—i.e., generally low molecular weight inorganic or organic acids—and, at least as far as is known, none has resulted in a product with all of the attributes required of a premium pasta product, namely (i) extended life at room temperature or normally prevailing refrigeration temperatures, (ii) ease of preparation and storage, (iii) freedom from the substantial presence of ambient liquid in the stored condition, (iv) substantially no off-flavor when in a condition suitable for consumption, and (v) when in such condition, palatability and appearance comparable to, or better than, products prepared from conventional dry pasta. For example, while some conventional acid-treated products may have a somewhat extended storage- or shelf-life, they have an acid taste. Indeed, it would seem to be inevitable that a pasta product treated with acid will have an acid taste.

Provision of a premium pasta product having the full complement of advantageous features described above would be a substantial advance over the technology discussed heretofore.

OBJECTS OF THE INVENTION

Accordingly, it is an object of the invention to provide a pasta product.

It is an additional object of the invention to provide a pasta product which has an extended life at room temperature or under normal conditions of refrigeration.

It is another object of the invention to provide a pasta product which is easily prepared and stored.

It is still another object of the invention to provide a pasta product which has substantially no off-flavor.

It is yet another object of the invention to provide a pasta product which is free from the substantial presence of ambient liquid in the stored condition.

It is a further object of the invention to provide a pasta product which, when in a condition suitable for consumption, is at least as palatable and appears at least as pleasing as products prepared from conventional dry pasta.

It is still a further object of the invention to provide a pasta product in a suitable container.

It is yet a further object of the invention to provide a method for the preparation of the above-mentioned pasta product.

These and other objects of the invention will be readily apparent from the following description and claims.

SUMMARY OF THE INVENTION

In one aspect, the invention is a method for the preparation of an acid-stabilized pasta, which comprises treating the pasta with a polymeric food-acceptable acid under conditions such that the pasta's life is extended without introducing acid flavor notes.

In a second aspect, the invention is a method for the preparation of acid-stabilized pasta, which comprises treating pasta with at least one polymeric food-acceptable acid in an amount, for a time, and at a temperature sufficient to effect the pasta's acid-stabilization.

In another aspect, the invention is a method for the preparation of acid-stabilized precooked pasta, which comprises cooking pasta in an aqueous solution or suspension of at least one polymeric food-acceptable acid, and packaging the precooked pasta in a container.

In yet another aspect, the invention is a method for the preparation of acid-stabilized pasta, which comprises placing pasta in a container with an aqueous solution or suspension of at least one polymeric food-acceptable acid in an amount such that the water component of the solution or suspension can be substantially absorbed into the pasta; sealing the container; and heating the container under conditions sufficient for the water component of the solution or suspension to be substantially absorbed by the pasta.

In still another aspect, the invention is acid-stabilized pasta prepared by any of the methods described above.

In a further aspect, the invention is acid-stabilized pasta which is substantially free of acid flavor notes.

In yet a further aspect, the invention is acid-stabilized pasta, which comprises pasta of water activity greater than 0.5 and a pH below about 4.6, and at least one polymeric food-acceptable acid component.

In still a further aspect, the invention is a system, which comprises acid-stabilized pasta, of water activity greater than 0.5 and a pH below about 4.6, at least one polymeric food-acceptable acid component, and a container in which the pasta resides.

The pasta in accordance with the present invention is advantageous in that, unlike previous pasta products, it has the full complement of features required of a premium pasta product, in contrast to prior pasta products which are deficient in one or more important respects. For example, the pasta of the present invention is easily prepared and stored. Further, it has an extended life, and thus lends itself to distribution, display and sale in a wide range of commercial settings, for instance in high-volume supermarkets, in convenience stores and in food-service establishments. Because of the unique attributes of the present invention, there is no need to sacrifice the taste and texture of a premium pasta product in order to secure the versatility in adaptation to the different marketing environments described above.

Furthermore, in certain embodiments, the invention is advantageous in eliminating the need for specialized delivery and storage conditions which result in considerable cost savings. Unlike fresh and frozen pasta, which must be refrigerated, the precooked pasta of the present invention, in these embodiments, can be held at ambient temperature for long periods of time without damaging the product or affecting its acceptability. The substantial economies resulting from obviating the need for refrigeration make the product commercially appealing from a cost standpoint.

In other embodiments, the pasta of the present invention can be held under refrigeration and will resist microorganism spoilage for substantially longer periods of time than are achieved with currently available conventional refrigerated pasta.

DESCRIPTION OF CERTAIN PREFERRED EMBODIMENTS

The acid-stabilized pasta of the invention, and the method of preparing it, provide a product having the attributes of a premium pasta product. It is a preserved food product with enhanced resistance to microorganism spoilage.

Pasta is, generally speaking, a class of food—whether raw, partially cooked, fully cooked or pretreated in some way—prepared from dough made from any suitable material, such as semolina, durum flour, farina, flour, corn, rice or wheat, or any combination of two or more of these, with water. Especially when in the raw or partially cooked state, the pasta typically absorbs water during cooking. It can be made with one or more optional ingredients, for instance whole egg, egg white, frozen egg white, dried egg white, or any two or all of these, seasonings such as onions, celery, garlic and bay leaf, salt, gum gluten and concentrated glyceryl monostesrate. The pasta can be enriched, fortified, etc., as is conventional. The pasta can be in any desired shape, such as sheets, spirals, noodles and tubes. It is within the scope of this invention that the pasta be in combination with other food substances such as meat, cheese, vegetables, fruits, sauces and the like, including coloring and flavoring, for example, the pasta in lasagna, filled capelletti, ravioli or tortellini.

As used herein, the term "acid-stabilized pasta" means pasta treated with a suitable acid or acids either in the free or dissociated state, under conditions (e.g., amount of acid, time of treatment, pH of treatment medium, temperature) such that the number of microbes destroyed in the pasta is sufficient, at least under conditions of refrigeration, to result in the pasta's maintaining its resistance to microorganism-spoilage for 90 days or more. Further, as used herein, to "treat" with acid(s) refers to treatment in any way suitable for effecting intimate contact between the pasta material and the acid(s), for example, by boiling pasta material in acidified water, by incorporating the acid(s) directly in the pasta material during formulation, by soaking pasta dough in acidified water, some combination of two or more of those measures, or the like.

In certain embodiments of the invention, the pasta is pre-cooked or at least cooked partially during preparation for storage and display pursuant to marketing. In these embodiments, the acid-stabilization of the product typically renders it shelf-stable. However, in other embodiments, the pasta simulates a fresh refrigerated product, and there is no cooking prior to distribution into marketing channels. The pasta in such cases is advantageously refrigerated, and under those conditions exhibits an extended life vis-a-vis conventional refrigerated pasta products.

For purposes of this invention, a product is considered to be "shelf-stable" when that product remains of acceptable quality from the time of manufacture until the anticipated time of consumption without means of preservation such as refrigeration. While a shelf-life of even 3 or 4 months would be acceptable under certain circumstances, typically, ready-to-eat products are considered to be shelf-stable if they remain of acceptable quality for at least 9 months, preferably at least 12 months, and especially at least 14 months. Sensory attributes of particular interest in assessing shelf-stability are color, texture, aroma, flavor, rancidity and tartness. A product is shelf-stable when these attributes are of acceptable quality after passage of the desired time. In particular, the growth of spoilage microorganisms should be inhibited in a shelf-stable product and this minimization over long periods of time is the hallmark of shelf-stability.

By "precooked" is meant that the pasta can be prepared for consumption merely by heating it, for instance in a conventional oven or a microwave oven, or by steaming it or immersing it in hot or boiling water, to a desired temperature for consumption. In a precooking step, the pasta is cooked for a sufficient time such that no prolonged heat treatment will be necessary in order to complete the cooking for consumption. This step can be carried out either in water or in the aqueous solution or suspension of acid.

Typically, the precooked pasta is reheated for a time of 30 seconds to 3 minutes. For example, in certain embodiments the pasta is heated in a microwave oven for a short time, e.g., about two minutes. In this way, if the pasta is heated in final preparation for dining, so little heating is necessary that essentially no further cooking occurs. However, in certain advantageous embodiments, since the precooked pasta is already fully cooked and ready to eat from the container, it can be used at room-temperature or in a cold pasta salad with no heating.

In still another advantageous embodiment, however, the pasta simulates fresh, refrigerated pasta and is not fully cooked.

An essential feature of the present invention is the utilization of at least one polymeric, typically macromolecular, food-acceptable acid. Typically, these acids are of high molecular weight, for example, having a subunit molecular weight of about 190, and can be copolymeric substances if desired. Of course, they are non-toxic, and additionally are materials which have the capability of retarding growth of spoilage microorganisms without imparting an acidic or other undesirable "off" flavor to the pasta.

The acid is used in an amount sufficient to attain conditions which result in the treated pasta's exhibiting the desired shelf-life or extended life, and one or more other attributes of a premium pasta product. It can be appreciated that the precise quantity of acid utilized in any particular embodiment will often depend on other considerations, such as the nature of the final product desired (for example, refrigerated but not necessarily shelf-stable, or non-refrigerated and substantially shelf-stable, etc.), the amount and type of pasta, the pH desired, other substances present, etc. For example, when the product is a precooked pasta, the acid can be present in an amount of from about 0.2 to 2 wt. % of the cooking medium or brine. However, the quantity can vary from one embodiment to another, and its determination is empirical. For instance, in another embodiment, the acid can be present in an amount as little as 0.085 wt. % of the cooking medium or brine. It is, in any event, within the capability of one ordinarily skilled in the art, once equipped with the teachings set forth herein, to determine the amount of acid which is needed.

The preferred polymeric food-acceptable acids have a cellulosic or saccharide-derived backbone with pendent carboxyl groups. A preferred polymeric acid in accordance with the invention is alginic acid; also preferred are the non-alginic polymeric food-acceptable acids such as carrageenic acid, pectinic acid, carboxymethyl cellulose acid. Combinations of two or more of the foregoing acids can also be utilized.

While the polymeric food-acceptable acid may be introduced as such, it can alternatively be generated in situ, for instance, by reaction between a salt of the polymeric acid and an inorganic acid. For instance, alginic acid may be generated by reacting sodium alginate with hydrochloric acid.

Additionally, derivatives of the acid may be used in place of the acid, or derivatives of the acid may be formed during cooking and be present in the product. All these embodiments are contemplated herein.

That the use of a polymeric food-acceptable acid enables pasta to be made shelf-stable, and have all the other attributes required of a premium pasta product, is surprising for a number of reasons. For example, previously proposed procedures which used an acid have all resulted in products which do not have all the attributes required of a premium pasta product. One typical failing is that the acids used impart an unpalatable acid taste to the pasta. However, this failing is remedied by the present invention.

The suitability of polymeric food-acceptable acids is additionally surprising since, as far as is known, these acids have never before been successfully used as acidulants for pasta. The aforementioned Japanese patent application apparently discloses use of polysaccharides, but not as acidulants. Rather, they are believed to be used as texturizing agents, and are not believed to survive processing. Other uses of the polymeric acids, and their sodium or calcium salts, are as thickening agents or coatings in food products. Also, alginates have been used as stabilizers in ice cream, water ices, sherbets and cheese, as gelling agents in water dessert gels and milk puddings, as suspending and thickening agents in fruit drinks and beverages, as foam stabilizers in beer, as emulsifiers in salad dressings and as film forming agents in coatings for meat and fish. For example, U.S. Pat. No. 3,332,786 apparently discloses that propylene glycol alginate "stabilizes" starch. (The specific starches mentioned are natural or modified starches derived from corn, wheat, potatoes, waxy maize and tapioca). However, this stabilization relates to the ability to withstand freeze-thaw cycles or gelling problems. It does not relate to, nor was it recognized as having any ability to providing, shelf-stability or other extension of product life as discussed herein.

Thus, the prior art provides no suggestion that such polymeric food-acceptable acids could be used as acidulants, let alone with the surprising results shown by the present invention.

Moreover, these polymeric acids are generally only sparingly soluble in water. For this reason, it is surprising that they can act as acidulants at all. It is further unexpected that they can produce the required acidification to produce a stable product without the use of undesirably large quantities of the acid.

In practicing certain embodiments of the invention, there are two separate considerations. The first consideration involves precooking, and the second is pasteurization. While it is preferable to precook and pasteurize simultaneously, it is not necessary to do so. In fact, partial cooking may take place before and/or during pasteurization.

In certain advantageous embodiments of the invention, a pasteurization step, sometimes herein referred to as acid-pasteurization, is essential. The minimum requirements are that the center temperature of the food should be held for a time sufficient to achieve killing of microorganisms, typically at a minimum of about 85° C. for at least about five minutes, and that the food should have a pH less than 4.6. If higher temperatures or lower pHs are used, then the treatment time may be reduced. However, it is preferred that, as a minimum, the pasteurization step, whatever the pH, should hold a center temperature of 85° C. for five minutes. More preferably, a center temperature of 93° C., should be held for 10 minutes. Generally, if the pasteurization step is carried out at a temperature of 100° C. or less, it is not necessary to use a pressurized heating system. The pasteurization step can be carried out under atmospheric pressure using hot water or steam to heat the product. If the pasteurization step is carried out at a temperature above 100° C., then the use of a pressurized system will prevent water from being driven off. In any event, the pasta is pasteurized while it is maintained at a pH of less than 4.6 by the use of the aqueous solution or suspension of at least one polymeric food-acceptable acid.

Of course, in other embodiments, it is desired to produce a pasta product simulating a fresh product. This can be achieved, for example, by incorporating the acid in the pasta dough or soaking or cooking the dough in an aqueous solution or suspension of acid to effect a pasta-pH low enough to result in the pasta's maintaining its resistance to microorganism spoilage for 90 days or more. For these embodiments, the pH of the product can be less than about 4.6, but can alternatively be higher, for example as high as 6.0, if the product is refrigerated or some analogous preservative measure is taken. It is within the skill of the art to derive the parameters best suited to this situation. For example, a higher pH could be employed if the life of the pasta need not be greatly extended. In these embodiments, too, the pasta typically is also pasteurized by passing it through a steam tunnel so that its center temperature is held at about 95° C. for about 5 minutes.

In certain advantageous embodiments, one or more conventional acidulants is utilized in addition to the polymeric acid. The conventional acidulants will be used to assist in controlling the pH of the pasta at the desired level. Typically, the conventional acidulant is present in a brine for cooking the pasta, in an amount of from about 0.1%, or in the pasta in an amount of about 0.05%. However, in some embodiments, the conventional acidulant is incorporated in the pasta dough. In certain embodiments, the conventional acidulant replaces some of the polymeric food-acceptable acid which would otherwise be needed. However, it should be ensured that the amount of conventional acidulant used is not so large as to impart an unacceptable flavor to the pasta, and that the amount of polymeric food-acceptable acid is not decreased to the extent that the advantages of the invention are lost.

Suitable conventional acidulants include inorganic acids, such as phosphoric, sulfuric and hydrochloric acids, and organic acids, such as citric, malic, acetic, fumaric, tartaric, adipic, lactic, ascorbic, sorbic, propionic and erythrobic acids. Citric acid is especially preferred, but malic acid is also preferred, as well as ascorbic acid. In certain embodiments, combinations of 20-60 wt. % alginic acid and 40-80 wt. % malic acid are used. Examples of combinations within this range are 50 wt. % alginic acid and 50 wt. % malic acid, and 30 wt. % alginic acid and 70 wt. % malic acid.

Salt and/or sugar, and other flavorings, for example at about 1 to 2% each, can also be used in the cooking medium or brine.

To measure the pH of the pasta, a known amount of the pasta, for example a 100 gram sample, is combined with an equivalent weight of distilled water in a blender until a homogeneous paste is achieved. Electrode tips are immersed in the paste while the paste is stirred. The electrode is allowed to stabilize for one minute before the pH reading is taken.

As previously discussed, in accordance with certain embodiments of the invention, pasta is precooked typically by boiling it to bring it to the desired state of preparation. However, boiling is not necessary and the pasta may be precooked at temperatures below 100° C. In certain embodiments, the temperature is between 90° C. and 100° C., preferably about 95° C. When it is expected that significant heat-exposure will be necessary in subsequent processing steps, such as pasteurization or other stabilization, the extent of prior partial cooking—e.g., cooking time and/or temperature—is commensurately less. Typically, the pasta is precooked (including any pasteurization or other stabilization) for about 5-20 minutes, especially 7-16 minutes,—and in certain other embodiments for about 10-30 minutes, preferably 15 minutes—for instance by boiling in the aqueous solution or suspension of said at least one polymeric food-acceptable acid. The aqueous solution or suspension typically has a pH from about 2.0–4.0, especially 2.4–2.8. In some embodiments, the aqueous solution or suspension has a pH from about 3.0–4.0, and preferably about 3.5. However, the exact time, pH, temperature and other conditions of precooking can vary from one embodiment to another, and the skilled artisan will be able to derive the particular precooking parameters best suited to the situation empirically, based on his level of skill and the teachings set forth herein. For example, it will be appreciated that the cooking times of the pasta will vary depending on the size, thickness and shape of the pasta and the degree to which it is precooked. Further guidance regarding suitable conditions to be used can be obtained from a study of the examples set forth hereinafter. Given the above disclosure and the examples, one skilled in the art will be able to determine appropriate conditions for processing pasta.

After cooking, the pH of the pasta should be below about 4.6 for a product whose pasteurization is desired. This is the generally recognized maximum pH which ensures that the pasteurized product remains shelf-stable. Typically, the pH of the pasta is in the range of about 3.8 to 4.6, preferably 3.8 to 4.2, or in some embodiments, 4.1 to 4.6, especially 4.3 to 4.4. In one preferred embodiment, the pH of the pasta is about 4.0. The pH can be below 3.8. However, the lower the pH, the more acid must be used and the more difficult it is to avoid acid flavor in the pasta. As a practical matter, the skilled person given the instant disclosure will be able to balance the pH level and amount of acid used to ensure that the pasta is shelf-stable and has substantially no acid flavor notes.

The pasta of the present invention is typically packaged in a container of configuration, construction and constituent material such that it is capable of maintaining the acid-stabilized pasta—i.e., providing an environment in which the pasta's shelf-stability or extended life due to acid-stabilization is not appreciably diminished by extraneous influences for substantially the entire period of its shelf-stability or extended life. During packaging, the temperature of the pasta in certain embodiments remains above about 90° C. while it is being placed in the container. In other embodiments, the pasta can first be cooled. The package is advantageously a container made of a microorganism-impermeable and/or waterproof material, for example glass, foil or a suitable plastic, and in some embodiments it is a container (for example, a pouch) made of oxygen-impermeable material. Such containers include, for example, cans, jars, bottles, foil trays, plastic trays, foil pouches and plastic pouches. The containers may be flexible or rigid. A particularly preferred container is a plastic tray, advantageously used with a foil or plastic lid. The plastic may be a single layer or, preferably a laminated material comprising a reinforcing layer, such as a nylon or polyester layer, and a sealing layer such as a polyethylene, polyvinylidene chloride or EVOH layer, for instance nylon/polyethylene or polyester/polyethylene. Alternatively, the package can be a laminate of board and plastics material, such as that sold as Combibloc. The advantage of packaging the pasta of the invention in plastic materials is that the product can be reheated in a microwave oven without the need to decant it before reheating.

In one embodiment, the pasta is packaged in the container under vacuum prior to pasteurization or other processing in connection with partial cooking (in which case the container is capable of withstanding heating attendant to such pasteurization or other processing). In other embodiments, the pasta of the present invention is preferably packed in the container under an inert gas atmosphere, for example, to avoid any discoloration of the product by oxidation during pasteurization, other processing, storage or display. Typically, the container is flushed with an inert gas, and then the container, is sealed and sterilized. Any suitable, non-toxic inert gas can be used, but nitrogen and especially carbon dioxide or mixtures of nitrogen and carbon dioxide are preferred. Typically, the atmosphere within the container is substantially free of oxygen. The package can be hermetically sealed.

Such packaging comprises substantially evacuating the container for holding the pasta, i.e., so that the air content in the container does not exceed 5%. In certain embodiments, pasteurization is effected by holding the pasta in the sealed container at a temperature of about 85° C., for example, about six minutes in steam for a pack 20 mm thick, followed by drying and cooling. When the pasta in the package is cool, reheating to the temperature mentioned above can be effected with steam or in hot water. Alternatively, the pasta may be pasteurized or otherwise processed in connection with partial cooking before the package is sealed.

The use of carbon dioxide is particularly advantageous in certain embodiments because it should provide further protection against spoilage. For instance, if the pasta of the present invention is subjected to such conditions as would allow water to gather in the package, such water could provide a breeding ground for microorganisms. However, if the product is packed in a carbon dioxide atmosphere, the gas will dissolve in free water present. This makes the water a much less conducive environment for growth of microorganisms. In other embodiments, food grade diatomic nitrogen is advantageously employed. By this measure, $CO_2$ produced by spoilage microorganisms will not be masked by $CO_2$ introduced as the inert atmosphere, and the detection of $CO_2$ will be an indication of the presence of such microorganisms.

A further refinement of the invention comprises introducing raw or partially cooked pasta into the container, typically but not necessarily dried to a moisture content of 12% or less, and a volume of a hot aqueous solution or suspension of the at least one polymeric food-acceptable acid. In one embodiment, the w/v ratio of pasta to solution or suspension is such that the total fill weight of the product is 2.8 to 3.0 times the weight of dry pasta. The solution or suspension can advantageously be at an elevated temperature, such as from 82°–98° C., but this is not required in all cases. The solution or suspension is incorporated in an amount such that it can be completely, or at least substantially, absorbed into the pasta upon heating. The container is sealed and its contents heated under conditions suitable to effect such absorption, for example at 90°–100° C.

If desired, pasta of the present invention may be coated with a small quantity of an edible oil, such as rice oil, sunflower oil, soybean oil, cottonseed oil or rape seed oil, for instance, to reduce sticking. The edible oil is used in a sufficient amount to alter the mouthfeel of the product and to alter the tendency of the pasta to stick together or clump during prolonged storage. Typically, the edible oil comprises from 0.5 to 1% by weight of the pasta. In one embodiment, the pasta may be passed through a hot solution made from an emulsion of 50% water, 50% vegetable oil and emulsifiers, the emulsion being diluted tenfold with water.

Further, if desired, the pasta can be quenched. It is preferred that the pasta be quenched, in an aqueous solution or suspension of at least one polymeric food-acceptable acid as already described, after heating in connection with precooking or partial cooking. A quenching liquid can also advantageously contain one or more conventional acidulants (also as already described) besides the polymeric acid. Whether or not a quenching liquid is used, the pasta can be washed (for instance in water) between steps and separated from, e.g. drained of, all free liquid prior to packaging or at least prior to sealing the container.

Accordingly, the finished precooked pasta in one embodiment of the invention typically has a water content greater than 12% and a pH below about 4.6. Preferably, the pasta has a water content of about 65 to about 75% and a pH from about 3.8 to 4.2. In particular, the pasta has a pH of about 4.0. Additionally, the pasta typically contains a characteristic acid component. This component preferably is included in an amount of approximately 0.2-2% (w/w), and especially 0.6% (w/w).

The acid component in the pasta includes any residue or moiety of the acid molecule which is present in the treated pasta and is a reflection of the fact that the pasta has been treated. As described, the pasta of the invention has the full complement of advantages and features that should be demanded of a premium pasta product, namely (i) extended life at room temperature or normally prevailing refrigeration temperatures, (ii) ease of preparation and storage, (iii) freedom from the substantial presence of ambient liquid in the stored condition, (iv) substantially no off-flavors when in a condition suitable for consumption, and (v) palatability and appearance comparable to, or better than, products prepared from conventional dry pasta.

The present invention is further described and illustrated in the following examples. It will be appreciated that these examples are provided solely for the purposes of illustrating the invention and not for the purpose of limitation. It will further be appreciated that variations and modifications to the product and process can be made by the skilled person without departing from the spirit or scope of the invention as defined in the appended claims.

EXAMPLE 1

Small spiral pasta prepared from a conventional pasta dough are used in this example. A stock solution containing 10 grams alginic acid and 8.0 grams citric acid in 4000 grams H$_2$O and having a pH of 2.5 is prepared.

500 grams of the small spiral pasta is boiled in a stockpot for 12 minutes in the stock solution. The cooked pasta is drained in a colander and filled into gas-impermeable trays made of polypropylene or a combination of APET and CPET. Foil polylaminate lidding material is heat-sealed to the trays under pressure. The containers and their contents are then placed in a retort, brought to an internal (center) temperature of 95° C. and held for 16 minutes to pasteurize the product The product has a pH of 4.53; when reheated, the pasta has the same organoleptic properties as similar pasta cooked in a conventional manner by boiling in water.

EXAMPLE 2

Small spiral pasta is prepared as in Example 1 except that rice oil is added to the spirals before packaging in the amount of 3 g of oil per 400 g of pasta. The product also has a pH of 4.53; when reheated, the pasta has the same organoleptic properties as similar pasta cooked in a conventional manner by boiling in water.

EXAMPLES 3-6

In these examples, stock solutions containing alginic acid and citric acid in water, in the amounts shown in the following table, are prepared. Pasta in the amounts shown is boiled in a stockpot for 15 minutes in the stock solution. The cooked pasta is drained in a colander and quenched in a stockpot with 2000 grams of the stock solution, and then filled into gas-impermeable trays made of polypropylene. The trays are flushed with food grade nitrogen and sealed as described above.

| Ex. | Amount Pasta (grams) | Amount citric acid stock (grams) | Amount alginic acid stock (grams) | Amount water stock (grams) | pH |
|---|---|---|---|---|---|
| 3 | 250 | 4 | 4 | 2000 | 3.98 |
| 4 | 250 | 4 | 3 | 2000 | 4.00 |
| 5 | 312.5 | 5 | 5.14 | 2500 | 4.28 |
| 6 | 312.5 | 5 | 5.6 | 2500 | 4.41 |

In every case, when reheated, the pasta has the same organoleptic properties as similar pasta cooked in a conventional manner by boiling in water.

EXAMPLES 7-10

Pasta is prepared in these examples, in the amounts shown, in the same way it is prepared in Examples 3-6 except that no quench solution is used.

| Ex. | Amount Pasta (grams) | Amount citric acid stock (grams) | Amount alginic acid stock (grams) | Amount water stock (grams) | pH |
|---|---|---|---|---|---|
| 3 | 250 | 4 | 4 | 2000 | 3.98 |
| 4 | 250 | 4 | 3 | 2000 | 4.00 |
| 5 | 312.5 | 5 | 5.14 | 2500 | 4.28 |
| 6 | 312.5 | 5 | 5.6 | 2500 | 4.41 |

Again, in every case, when reheated, the pasta has the same organoleptic properties as similar pasta cooked in a conventional manner by boiling in water.

EXAMPLES 11-16

In these examples, stock solutions containing alginic acid and/or pectinic acid in water, in the amounts shown in the following table, are prepared. Pasta in the amounts shown are boiled in a stockpot for minutes in the stock solution. The cooked pasta is drained in a colander for 1 minute and quenched in a stockpot with the stock solution. All products are coated with vegetable oil.

| Ex. | Amount Pasta (grams) | Amount pectinic acid stock (grams) | Amount alginic acid stock (grams) | Amount water stock (grams) | pH |
|---|---|---|---|---|---|
| 11 | 500 | 15 |    | 4000 | 4.58 |
| 12 | 500 | 20 |    | 4000 | 4.32 |
| 13 | 500 | 10 | 10 | 4000 | 4.55 |
| 14 | 500 | 13 | 13 | 4000 | 4.35 |
| 15 | 500 |    | 25 | 4000 | 4.52 |
| 16 | 500 |    | 30 | 4000 | 4.50 |

Again, in every case, the pasta has the same organoleptic properties as similar pasta cooked in a conventional manner by boiling water.

The terms and expressions which have been employed are used as terms of description and not of limitation, and there is no intention in the use of such terms or expressions of excluding any equivalents of the features shown and described as portions thereof, its being recognized that various modifications are possible within the scope of the invention.

We claim:

1. A method for the preparation of an acid-stabilized pasta, which comprises contacting the pasta with an aqueous solution or suspension of at least one polymeric food-acceptable acid in an amount sufficient to effect acid-stabilization such that said pasta has a pH below about 4.6 and substantial freedom from acid flavor notes, and wherein said pasta is shelf-stable.

2. A method for the preparation of acid-stabilized pasta, which comprises contacting the pasta with an aqueous solution or suspension of at least one polymeric food-acceptable acid in an amount, for a time, and at a temperature sufficient to effect the pasta's acid-stabilization, wherein said pasta has a pH below about 4.6 and its shelf-stable.

3. A method as defined in claim 2, wherein the polymeric food-acceptable acid is alginic acid.

4. A method as defined in claim 2, which comprises cooking said pasta in the aqueous solution or suspension of said polymeric food-acceptable acid.

5. A method as defined in claim 4, wherein said aqueous solution or suspension of at least one polymeric food-acceptable acid has a pH from about 2.4 to 2.8.

6. A method as defined in claim 4, wherein at least one other food-acceptable acid is dissolved or suspended in the aqueous solution or suspension of at least one polymeric food-acceptable acid.

7. A method as defined in claim 6, wherein each said other food-acceptable acid is selected from the group consisting of citric, malic, acetic, fumaric, tartaric, phosphoric, adipic, lactic, ascorbic, sorbic, propionic, erythorbic, sulfuric and hydrochloric acids.

8. A method as defined in claim 7, which comprises cooking said pasta in an aqueous solution or suspension of at least one polymeric food-acceptable acid and of at least citric acid.

9. A method as defined in claim 4, which further comprises quenching said precooked pasta in an aqueous solution or suspension of at least one polymeric food-acceptable acid.

10. A method as defined in claim 9, wherein each polymeric food-acceptable acid used for quenching is alginic acid.

11. A method as defined in claim 9, wherein at least one other food-acceptable acid is dissolved or suspended in the aqueous solution or suspension of at least one polymeric food-acceptable acid used for quenching.

12. A method as defined in claim 11, wherein each said other food-acceptable acid dissolved or suspended in the aqueous solution or suspension used for quenching is selected from the group consisting of citric, malic, acetic, fumaric, tartaric, phosphoric, adipic, lactic, ascorbic, sorbic, propionic, erythorbic, sulfuric and hydrochloric acids.

13. A method as defined in claim 4, which comprises subjecting the pasta to processing conditions such that it is in an acid-pasteurized state.

14. A method as defined in claim 4, which comprises subjecting the pasta to processing conditions such that it is in a precooked state.

15. A method as defined in claim 2, which comprises cooking pasta in an aqueous solution or suspension of at least one polymeric food-acceptable acid under conditions such that said pasta has a pH from about 3.8 to 4.2.

16. A method as defined in claim 15, which comprises cooking pasta under conditions such that said pasta has a pH of about 4.0.

17. A method as defined in claim 4, which further comprises separating said cooked pasta from residual solution or suspension.

18. A method as defined in claim 4, which further comprises contacting said cooked pasta with an 19. A method as defined in claim 18, wherein said amount of edible oil is from about 0.5 to 1% by weight of the pasta.

20. A method for the preparation of shelf-stable pasta, which comprises cooking pasta in an aqueous solution or suspension of at least one polymeric food-acceptable acid for a time and at a temperature sufficient to effect acid-pasteurization, shelf-stability and a pH below about 4.6, and packaging the pasta in a container.

21. A method as defined in claim 20, which comprises subjecting the pasta to conditions such that the pasta in the package is in a precooked state.

22. A method as defined in claim 20, wherein said packaging step comprises inserting a measured amount of said precooked pasta into a container, flushing the container with an inert gas, sealing said container and sterilizing the contents thereof.

23. A method as defined in claim 20, wherein said container is microorganism-impermeable, waterproof, or both microorganism-impermeable and waterproof.

24. A method as defined in claim 20, wherein said container is a plastic tray or pouch.

25. A method as defined in claim 24, wherein said plastic tray or pouch comprises a laminate of a reinforcing layer and a sealing layer.

26. A method as defined in claim 20, wherein said packaging step comprises substantially evacuating a container for holding the cooked pasta.

27. A method for the preparation of shelf-stable pasta, which comprises introducing pasta into a container with an aqueous solution or suspension of at least one polymeric food-acceptable acid in respective amounts such that the water component of the solution or suspension can be substantially absorbed into the pasta; sealing the container; and heating the contents of the container such that the water component of the solution or suspension is substantially absorbed into the pasta and such that acid-pasteurization is effected and wherein a shelf-stable pasta is produced.

28. A method as defined in claim 27, wherein said pasta is partially cooked prior to its introduction into the container.

29. A method as defined in claim 27, which comprises subjecting the pasta to conditions such that it is in a precooked state upon completion of acid-pasteurization.

30. Acid-stabilized pasta prepared by the method which comprises contacting pasta with a polymeric food-acceptable acid under conditions such that the pasta is acid-stabilized without introducing acid-flavor notes, wherein said pasta has a pH below about 4.6 and is shelf-stable.

31. Acid-stabilized pasta as defined in claim 30, wherein said polymeric food-acceptable acid is alginic acid.

32. Acid-stabilized pasta as defined in claim 30, wherein said method comprises cooking said pasta in an aqueous solution or suspension of said polymeric food-acceptable acid.

33. Acid-stabilized pasta as defined in claim 32, wherein said aqueous solution or suspension of at least one polymeric food-acceptable acid has a pH from about 2.4 to 2.8.

34. Acid-stabilized pasta as defined in claim 32, wherein said acid is alginic acid 35. Acid-stabilized pasta as defined in claim 32, wherein at least one other food-acceptable acid is dissolved or suspended in the aqueous solution or suspension of at least one polymeric food-acceptable acid.

36. Acid-stabilized pasta as defined in claim 32, wherein the pasta is subjected to conditions such that it is in an acid-pasteurized state.

37. Acid-stabilized past as defined in claim 32, wherein the pasta is subjected to conditions such that it is in a precooked state.

38. Acid-stabilized pasta as defined in claim 33, wherein said cooking is under conditions such that said pasta has a pH from about 3.8 to 4.2.

39. Acid-stabilized pasta as defined in claim 38, wherein said cooking is under conditions such that said pasta has a pH of about 4.0.

40. Acid-stabilized pasta as defined in claim 30, wherein said pasta has a water content greater than 12%.

41. Acid-stabilized pasta as defined in claim 30, wherein the polymeric food-acceptable acid is selected from the group consisting of alginic acid, pectinic acid, carrageenic acid and carboxymethylcellulose acid.

42. Acid-stabilized pasta as defined in claim 36, wherein each said other food-acceptable acid component is selected from the group consisting of citric, malic, acetic, fumaric, tartaric, phosphoric, adipic, lactic, ascorbic, sorbic, propionic, erythorbic, sulfuric and hydrochloric acids.

43. Acid-stabilized pasta as defined in claim 35, wherein said other food-acceptable acid component is citric acid.

44. Acid-stabilized pasta as defined in claim 40, which further comprises an amount of edible oil sufficient to prevent the pasta from sticking together.

45. Acid-stabilized pasta as defined in claim 44, wherein said amount of edible oil is from about 0.5 to 1% by weight of the pasta.

46. A system which comprises acid-stabilized pasta as claimed in claim 40, and a container in which the pasta resides.

47. A system as defined in claim 46, wherein said container is microorganism-impermeable, waterproof, or both microorganism- impermeable and waterproof.

48. A system as defined in claim 46, wherein said container is a plastic tray or pouch.

49. A system as defined in claim 66, wherein said plastic pouch comprises a laminate of a reinforcing layer and a sealing layer.

50. A system as defined in claim 46, wherein the pasta is under vacuum within the container.

51. A system as defined in claim 46, wherein the pasta resides in an inert atmosphere within the container.

52. An acid-stabilized pasta prepared by acidifying pasta with an aqueous solution or suspension of at least one polymeric food-acceptable acid in a quantity sufficient to provide pasta having a pH below about 4.6.

53. An acid-stabilized pasta as defined in claim 52, wherein said aqueous solution or suspension of at least one polymeric food-acceptable acid is present in the pasta dough.

54. An acid-stabilized pasta as defined in claim 52, further prepared by heat-pasteurizing the pasta.

55. An acid-stabilized pasta as defined in claim 53, further prepared by heat-pasteurizing the pasta.

56. A method for the preparation of acid-stabilized pasta, which comprises introducing said polymeric food-acceptable acid during formulation of the pasta dough.

57. A method as defined in claim 56, further comprising heat-pasteurizing the pasta.

58. A method of preparing pasta for consumption, which comprises heating a product as defined in claim 30.

59. A method as defined in claim 1, wherein the polymeric food-acceptable acid is a non-alginic polymeric food-acceptable acid.

60. A method as defined in claim 59, which comprises cooking said pasta in an aqueous solution or suspension of at least one non-alginic polymeric food-acceptable acid and of at least citric acid.

61. A method as defined in claim 1, wherein the at least one polymeric food-acceptable acid has a pH of less than 3.0 or greater than 4.0 and less than or equal to 6.0.

62. A method for the preparation of shelf-stable pasta, which comprises introducing pasta into a container with an aqueous solution or suspension of at least one polymeric food-acceptable acid having a pH of less than 3.0 or greater than 4.0 and less than or equal to 6.0, in respective amounts such that the water component of the solution or suspension can be substantially absorbed into the pasta, said container being capable of maintaining the pasta throughout the period of its shelf-stability; sealing the container; and heating the contents of the container such that the water component of the solution or suspension is substantially absorbed into the pasta and such that acid-pasteurization is effected.

63. Acid-stabilized pasta produced by the method defined in claim 59, 60, 61 or 62.

* * * * *

UNITED STATES PATENT AND TRADEMARK OFFICE
CERTIFICATE OF CORRECTION

PATENT NO. : 5,332,587

DATED : July 26, 1994

INVENTOR(S) : John G. Howard, et al.

It is certified that error appears in the above-identified patent and that said Letters Patent is hereby corrected as shown below:

Claim 18, column 14, line 27, after "an" the following should be inserted: --amount of edible oil sufficient to prevent the pasta from sticking together.--

Claim 49, column 16, line 12, the claim reference numeral "66" should read --48--.

Signed and Sealed this

Fourth Day of October, 1994

Attest:

BRUCE LEHMAN

Attesting Officer

Commissioner of Patents and Trademarks